Jan. 15, 1946.  D. R. MOORE  2,393,053
WEIGHT INDICATOR
Filed April 19, 1944   2 Sheets-Sheet 1

Dewey R. Moore
INVENTOR.

BY
Victor J. Evans & Co.
ATTORNEYS

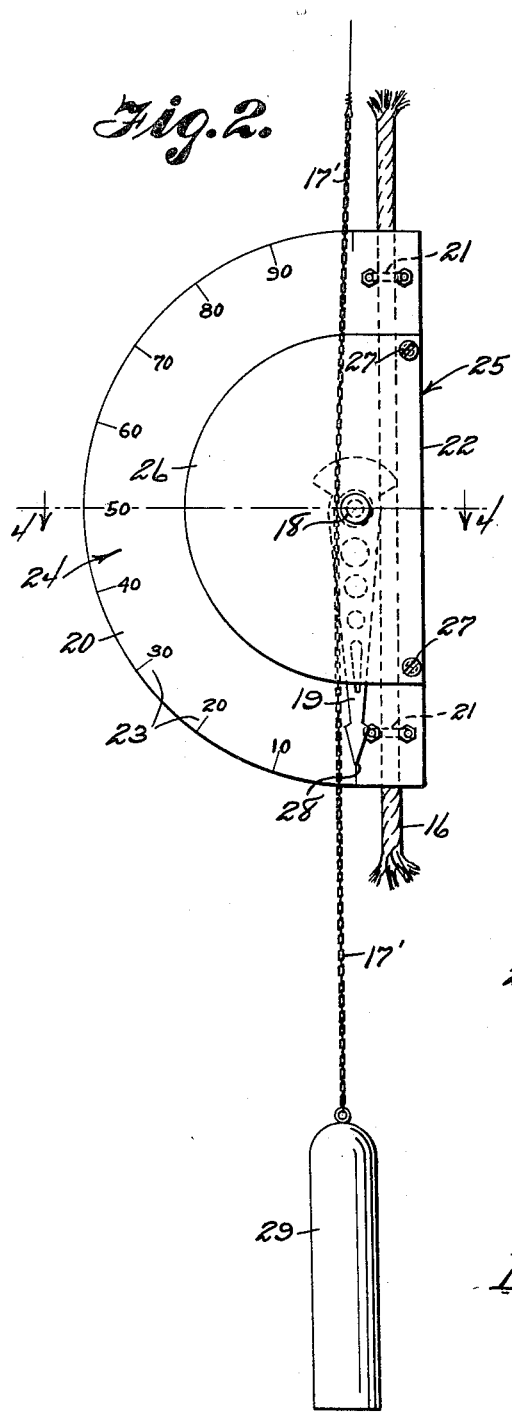
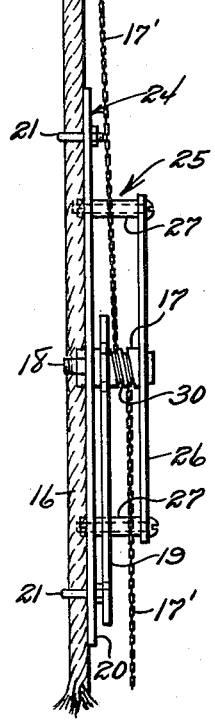
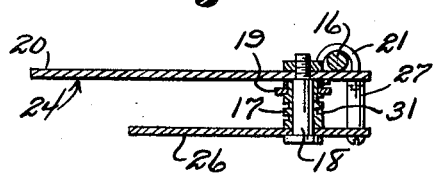

Patented Jan. 15, 1946

2,393,053

UNITED STATES PATENT OFFICE 2,393,053

WEIGHT INDICATOR

Dewey R. Moore, Holdenville, Okla.

Application April 19, 1944, Serial No. 531,812

4 Claims. (Cl. 73—143)

The invention relates to a line tension measuring apparatus and more particularly to weight indicators for drilling machinery.

The primary object of the invention is the provision of a device of this character, wherein the use thereof in a drilling rig will accurately indicate the weight imposed upon the cable when the machine is in operation, that is to say, the amount of weight upon the bit when drilling.

Another object of the invention is the provision of a device of this character, wherein the indicator is located at a convenient point on the cable of a drilling machine, so that the said indicator is readily visible at all times and can be easily read to ascertain the weight imposed upon the cable during the drilling operation, the actuation of the indicator being had through the stretch of the dead line.

A further object of the invention is the provision of a device of this character, which is simple in its construction, thoroughly reliable and efficient in operation, accurate in the working thereof, strong, durable, definitely visible, easy of application, possessing few parts, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 2 is an enlarged elevation of the indicator per se.

Figure 3 is an edge elevation thereof.

Figure 4 is a sectional view on the line 4—4 of Figure 3 looking in the direction of the arrows.

Similar reference characters indicate corresponding parts throughout the several views in the drawings.

Figure 1:
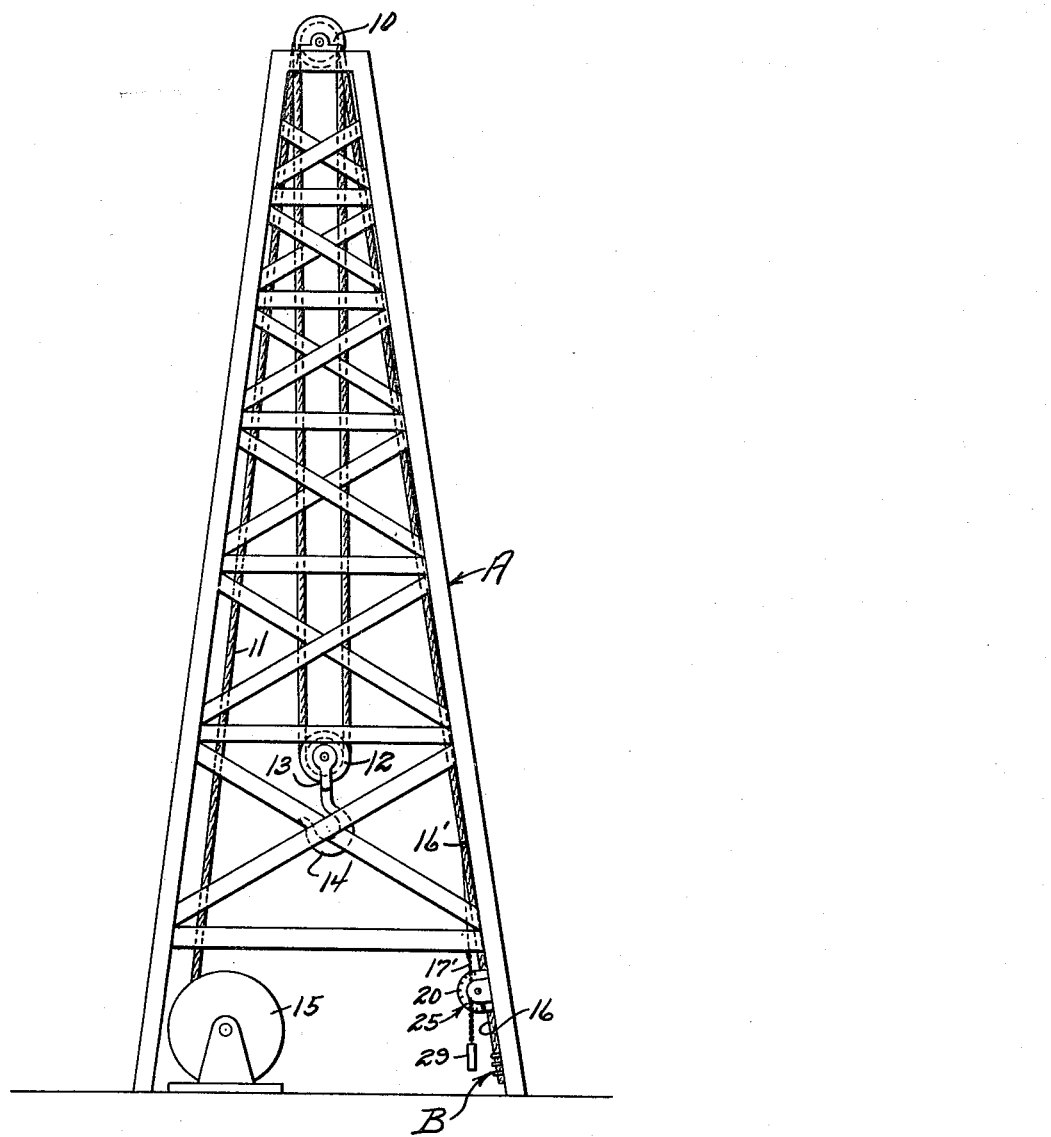
Figure 1 is an elevation of a well drill rig showing the weight indicator constructed in accordance with the invention applied.

Referring to the drawings in detail A designates the usual construction generally of a well drilling derrick at the top of which is supported a crown block 10 which carries a plural-wound cable 11 having a travelling block 12. The travelling block 12 supports a block-bail 13 having a hook 14. The cable 11 at one end is wound and unwound on and from a drum or windlass 15 of the ordinary well known construction and operated in the conventional manner.

The other end of the cable 11 is the dead end portion 16 which is anchored at B to the derrick A adjacent to the base thereof, while at a selected distance removed from this base the said dead end portion 16 of the cable 11 has fixed thereto at 16' a weighted chain 17' which is spiraled around a turning hub 17 on the axle 18 of an indicator pointer 19 of a weight indicator. This indicator comprises a substantially half-circular shaped plate dial 20 which through the medium of rope or cable clamps 21 is made fast to the dead end portion 16 of the cable 11 as is clearly shown in Figures 1 and 3 of the drawings.

The clamps 21 are located at the straight edge 22 of the dial 20 and the pointer 19 traverses a graduated scale 23 of the reading face 24 of the dial 20, and this scale 23 is for weight calculation upon the stretching of the dead end portion 16 of the cable 11. The dial is a part of a frame 25 including a body plate 26 and spacer members 27, respectively. The pointer axle 18 is centered with relation to the arcuate scale 23 and its end or tip 28 identifies the graduations of the scale 23 for indicating the weight imposed on the cable 11 during the drilling operation.

The weight 29 for the chain 17' is at the free end of the latter and the spiral 30 in this chain rests in a groove 31 in the hub 17, this being shown in Figure 3 of the drawings.

The weight indicator is operated by the stretch of the dead end portion 16 in that as the load is increased on the travelling blocks, the dead line stretches, decreasing approximately as the load is increased up to its full capacity. As for example, the dead line will stretch more on the first one-thousand pound pull than it would on the ten-thousand pound pull. Therefore the graduations of the scale 23 of the indicator decrease in distance from one another when reading the said scale 23 from 1 to 100.

The purpose of the indicator is to warn a driller when he has pulled all the equipment the derrick can safely handle and to show when there is the desired amount of weight on the bit when drilling.

What is claimed is:

1. In a drilling cable having a dead end portion anchored at one end, a weight indicator fixed to the dead end portion and having a scale dial, a pointer traversing said dial, and a weighted chain fixed to the dead end portion at a point spaced from that at which said weight indicator is fixed and operating said pointer.

2. In a drilling cable having a dead end portion anchored at one end, a weight indicator fixed to the dead end portion and having a scale dial, a pointer traversing said dial, a weighted chain fixed to the dead end portion at a point spaced from that at which said weight indicator is fixed and operating said pointer and a turning hub for the pointer and having the chain spiraled around said hub.

3. In a drilling cable having a dead end portion anchored at one end, a weight indicator fixed to the dead end portion and having a scale, a pointer traversing said scale, and a weighted cable fixed to the dead end portion at a point spaced from that at which said weight indicator is fixed and operating said pointer.

4. In a drilling cable having a dead end portion anchored at one end, a weight indicator fixed to the dead end portion and having a scale dial, a pointer traversing said dial, a weighted cable fixed to the dead end portion at a point spaced from that at which said weight indicator is fixed and operating said pointer, and a turning hub for the pointer and having the cable spiraled around said hub.

DEWEY R. MOORE.